United States Patent
Rösch

(10) Patent No.: US 11,208,059 B2
(45) Date of Patent: Dec. 28, 2021

(54) STRUCTURAL ELEMENT FOR A MOTOR VEHICLE AND METHOD OF MANUFACTURING A STRUCTURAL ELEMENT

(71) Applicant: Auto-Kabel Management GmbH, Hausen i.W. (DE)

(72) Inventor: Markus Rösch, Mainz (DE)

(73) Assignee: Auto-Kabel Management GmbH, Hausen i.W. (DE)

( * ) Notice: Subject to any disclaimer, the term of this patent is extended or adjusted under 35 U.S.C. 154(b) by 0 days.

(21) Appl. No.: 17/269,587

(22) PCT Filed: Aug. 12, 2019

(86) PCT No.: PCT/EP2019/071551
§ 371 (c)(1),
(2) Date: Feb. 19, 2021

(87) PCT Pub. No.: WO2020/048736
PCT Pub. Date: Mar. 12, 2020

(65) Prior Publication Data
US 2021/0253044 A1    Aug. 19, 2021

(30) Foreign Application Priority Data

Sep. 7, 2018    (DE) .................... 10 2018 121 882.6

(51) Int. Cl.
*B60R 16/02*    (2006.01)
*B62D 21/17*    (2006.01)
(Continued)

(52) U.S. Cl.
CPC .......... *B60R 16/0207* (2013.01); *B62D 21/17* (2013.01); *B32B 5/26* (2013.01);
(Continued)

(58) Field of Classification Search
CPC ..... B29L 2031/30; B32B 15/02; B32B 15/08; B32B 5/028; B32B 5/12; B32B 5/26;
(Continued)

(56) References Cited

U.S. PATENT DOCUMENTS 10,745,099 B2 *    8/2020 Long .................... B32B 5/26
2016/0176153 A1    6/2016 Dietz et al.
(Continued)

FOREIGN PATENT DOCUMENTS

DE    10 2011 012 143 A1    8/2012
DE    10 2011 109 724 A1    2/2013
(Continued)

OTHER PUBLICATIONS

International Searching Authority/EP, International Search Report and Written Opinion of the International Searching Authority, Application No. PCT/EP2019/071551, dated Nov. 8, 2019, with English translation of the search report, 15 pages.
(Continued)

*Primary Examiner* — Camie S Thompson
(74) *Attorney, Agent, or Firm* — Sunstein LLP

(57) ABSTRACT

Structural element for a motor vehicle, in particular a frame part for a chassis or a passenger compartment of the motor vehicle, having at least a first and a second fiber layer forming a rigid fiber composite, the fiber layers being laminated to one another at least in sections, and at least one electrical flat conductor arranged between the fiber layers and laminated to the fiber layers. The flat conductor has a relief structure on at least one surface facing at least one fiber layer.

20 Claims, 9 Drawing Sheets

(51) Int. Cl.
*B32B 5/26* (2006.01)
*B62D 29/04* (2006.01)

(52) U.S. Cl.
CPC ... *B32B 2260/046* (2013.01); *B32B 2262/101* (2013.01); *B32B 2262/106* (2013.01); *B32B 2605/08* (2013.01); *B62D 29/04* (2013.01)

(58) Field of Classification Search
CPC ............ B32B 2650/08; B32B 2650/00; B32B 2650/18; B32B 2311/00; B32B 2305/076; B32B 2305/04; B32B 3/08; B32B 2250/40; B32B 2262/106; B32B 2301/202; B32B 2301/302; B32B 2457/00; H05B 3/36; H05B 6/362; B62D 29/005; B62D 21/17; B62D 25/02; B29C 70/34; B29C 70/72; B29C 70/885; B29C 70/202; B29C 70/86; B60R 16/0207
USPC ....... 307/10; 428/297.1, 297.4, 300.1, 301.1, 428/299.1, 299.4, 299.7
See application file for complete search history.

(56) References Cited

U.S. PATENT DOCUMENTS

2016/0271901 A1\* 9/2016 Demange ................ B32B 1/00
2018/0236881 A1 8/2018 Grienitz et al.

FOREIGN PATENT DOCUMENTS

| | | |
|---|---|---|
| DE | 10 2013 101 801 A1 | 8/2014 |
| EP | 3366553 A1 | 8/2018 |
| WO | WO 2012/164210 A2 | 12/2012 |
| WO | WO 2016/102455 A1 | 6/2016 |
| WO | WO 2018/141982 A1 | 8/2018 |

OTHER PUBLICATIONS

German Patent Office, Office Action, Application No. 10 2018 121 882.6, dated May 20, 2019, in German, 5 pages.

\* cited by examiner

STRUCTURAL ELEMENT FOR A MOTOR VEHICLE AND METHOD OF MANUFACTURING A STRUCTURAL ELEMENT

CROSS-REFERENCE TO RELATED APPLICATIONS

This application is the national phase entry of international patent application no. PCT/EP2019/071551 filed Aug. 12, 2019 and claims the benefit of German patent application No. 10 2018 121 882.6, filed Sep. 7, 2018, the disclosures of which are incorporated herein by reference in their entirety.

TECHNICAL FIELD

The subject matter relates to a structural element for a motor vehicle and a method of manufacturing such a structural element. The structural elements according to the subject matter are in particular frame parts for a chassis or a passenger compartment of a motor vehicle. The structural elements can in particular be load-bearing parts, in particular parts of a supporting frame of a motor vehicle. Furthermore, structural elements can be attachment parts to a supporting frame as well as chassis parts and passenger compartment parts. In particular, structural elements can be floor-side structural elements, especially in the area of a base trough or the base trough itself.

BACKGROUND ART

The use of fiber-reinforced composites, in particular fiber-reinforced plastics, is gaining increasing importance in automotive engineering due to their potential for lightweight construction. Due to increased requirements for optimized fuel consumption, vehicle manufacturers are always looking for further ways to limit the weight of vehicles, in particular to increase CO2 saving potentials.

In addition, fiber-reinforced plastics offer the possibility of shaping the material behavior in a direction-dependent manner, in particular by aligning the fiber in the transverse or longitudinal direction. In this way, in particular load-bearing structures of motor vehicles can be optimized in terms of their direction-specific load-bearing capacity.

A disadvantage of using fiber-reinforced plastics, however, is their lack of electrical conductivity. In contrast to previous motor vehicles, in which the load-bearing structures were formed by sheets or tubes of steel or aluminium material, which are electrically conductive, such conductivity is no longer present in fiber-reinforced plastics. This requires new types of conductor concepts when using fiber-reinforced plastics compared with conventional sheet metal bodies. In particular conductor concepts covering the entire vehicle, for example also for the distribution of a battery mass potential, must be redesigned.

For distributing electrical power in bodies with fiber-reinforced plastics, solutions are already known. For example, DE 10 2013 101 801 A1 shows a structural element with a conductor arrangement. The conductor arrangement is laminated between the fiber layers and enables potential distribution within a vehicle. However, in particular the use of flat conductors, as also proposed in DE 10 2013 101 801 A1, carries the risk of delamination. Due to the smooth surfaces of a conventional flat conductor inserted between the fiber layers, delamination of the conductor from the fiber layers can occur during operation. This delamination is problematic in several respects. In particular, the delamination can adversely affect the structure and load-bearing capacity of the structural element. In addition, it is possible that moisture can penetrate into areas of delamination and thus contribute to increased corrosion of the conductor.

Against this background, the subject matter was based on the object of providing a structural element made of a fiber composite material that enables long-lasting potential distribution within a motor vehicle.

SUMMARY OF THE INVENTION

The structural element according to the subject matter can in particular be used as a supporting structure of a motor vehicle, for example a motor vehicle frame or a part of a passenger compartment. Attachment parts may also be formed as the structural element according to the subject matter. For example, doors, hoods, fenders and/or front wings, base troughs, support frames or the like can be structural elements according to the subject matter.

The structural element according to the subject matter is a laminated fiber composite structure. This has at least a first and at least a second fiber layer. These two fiber layers are at least partially laminated to each other. As a result of the lamination, the fiber layers form a substantially rigid fiber composite and thus give the structural element its spatial-physical structure.

The orientation of the fibers relative to each other as well as the orientation of the fibers within the structural element allows the structural element to be adapted to the intended application in terms of its bending properties as well as its fracture properties.

To enable electrical conduction within the vehicle, an electrical flat conductor runs between the at least two fiber layers. An electrical flat conductor is in particular a conductor formed from a solid material with a preferably rectangular conductor cross-section. The flat conductor preferably has a minimum conductor cross section of 16 $mm^2$. In particular, the flat conductor is resistant to bending and is self-supporting. No significant elastic deformations of the flat conductor occur due to its own weight. The flat conductor is designed to carry currents of more than 10 A, preferably more than 50 A, in particular more than 100 A. The flat conductor thus is an energy conductor in contrast to a foil conductor, in which a conductive metal foil is inserted between two foils.

In order to prevent delamination of the structural element in the area of the flat conductor after manufacture, it is proposed that the flat conductor has a relief structure on at least one surface facing at least one fiber layer. That is, the surface of the flat conductor is deliberately roughened and/or profiled so that the relief structure is formed. The relief structure results in a better form fit between the flat conductor and the fiber layers or the composite material joining the fiber layers. The fibers or the fiber layers thus adhere better to the flat conductor and, even under mechanical stress, no delamination of the flat conductor from at least one of the fiber layers occurs.

In particular, the relief structure is such that it forms undercuts on the surface of the flat conductor. In this case, the relief structure can change the surface in such a way that there are recesses on the surface which have a larger area at a deeper penetration depth and/or whose volume increases over proportionally to the penetration depth. The undercuts can be regular and/or irregular. The composite material penetrates into the recesses and thus the undercuts, hardens and interlocks with the undercuts.

In particular, the relief structure is such that it forms a surface porosity of the flat conductor. The flat conductor can have a porosity of between 5% and 50% at its surface with a penetration depth of between 0 and 10 mm, preferably also 20 mm, in particular less than 20% of the total thickness of the flat conductor. The porosity is preferably an open porosity. In particular, the porosity is a macro porosity with pore sizes larger than 50 nm.

According to an embodiment, it is proposed that the relief structure is regular or irregular. For example, a regular relief structure can be introduced by a laser. It is also possible that the relief structure is introduced by non-cutting forming, for example by roll rolling, rolling, punching, pressing or the like. The relief structure can be lattice-shaped or strip-shaped, wherein a lattice shape can have, for example, triangular, rectangular, hexagonal and also round or oval lattice structures.

The relief structure can be introduced by laser processing. A regular relief structure can be introduced by suitable profiled rollers with a positive profile. An irregular relief structure can be introduced by roughening, sputtering or the like.

According to an embodiment, the relief structure can be formed from protrusions and/or recesses on at least one surface of the flat conductor. In particular, the flat conductor may have a square or rectangular cross-section. In the latter case, the flat conductor has two wide surfaces and two narrow surfaces, each being opposite to each other, respectively. In the former case, the flat conductor has four equal surfaces opposite to each other. The flat conductor further has two opposing end surfaces at the respective ends. The protrusions and/or recesses may be applied to two opposing surfaces, or to only one surface, or to all surfaces except the end surfaces.

It is also possible for the relief structure to be formed from recesses which penetrate through the flat conductor. In particular, a lattice structure is conceivable here, in which openings are formed in the flat conductor by the recesses, into which the composite material can penetrate, resulting in an excellent form fit between the flat conductor and the composite material.

In this context, it is particularly preferred that the flat conductor is formed as a grid. The grid may be regular or irregular. The grid can have a round, in particular circular or oval grid structure as well as an angular grid structure, for example triangular, square, hexagonal, octagonal or the like. The grid structure can be formed by wires or expanded metal. The composite material can penetrate into the openings of the lattice structure to improve the form fit.

According to one embodiment, it is proposed that the flat conductor is formed from solid material, in particular from a copper material and/or an aluminium material. In contrast to stranded conductors or mesh conductors, the flat conductor is preferably formed from a solid material. The solid material can be a copper material, in particular pure copper or a copper alloy. An aluminium material, for example A199.5 or another aluminium alloy, can also be used as a material for the flat conductor.

According to an embodiment, it is proposed that the fiber layers are formed of fiber composite material with fibers and a matrix of composite material. In particular, the fibers may be glass fibers, carbon fibers, ceramic fibers, aramid fibers, boron fibers, basalt fibers, natural fibers and/or nylon fibers. The fibers may be laid regularly or irregularly in their fiber direction.

The composite material bonding the fibers and/or fiber layers to one another may in particular be a polymer, in particular a duroplast, a synthetic resin, an elastomer and/or a thermoplastic. The fiber layers are impregnated with the composite material, which subsequently cures and thus forms a stable structure. Here, according to the subject matter, the flat conductor is inserted between two fiber layers and also impregnated with the composite material at the same time as the fiber layers, so that the matrix of the composite material preferably completely encloses both the fiber layers and the flat conductor.

For shaping, it is possible that the fiber layers, before they have been impregnated with the composite material and/or before the composite material has cured, are shaped by means of pressing or drawing. During this forming process, the flat conductor can be formed at the same time. For this purpose, it is proposed that the flat conductor is formed in particular from a soft-annealed aluminium material in order to be particularly easy to form. Preferably, the forming is carried out by means of bending, pressing or drawing, and particularly preferably the flat conductor is deep-drawn together with the fiber layers. After deep drawing, the composite of fiber layer and flat conductor can be impregnated with the composite material, which cures and the structural element permanently assumes the deep-drawn structure. Also, deep drawing may be performed after impregnation and before curing of the composite material.

According to one embodiment, it is proposed that the flat conductor is formed in at least one electrically closed conductor loop in the structural element. Due to the novel electrical supply concepts required as a result of the fiber composite material, it has been found that a circumferential ring conductor is particularly sensible. Therefore, it is proposed that at least one flat conductor forms a closed conductor loop in a structural element. This has the advantage that the conductor loop has an increased current-carrying capacity compared with a single conductor and also increased redundancy. Two electrical paths run between each two connection points on the conductor loop On the one hand, each carries approximately half of the total current, on the other hand, in the event of failure of one path, they can take over the current conduction of this failed path.

A structural element can be, for example, a frame part or a base assembly. The flat conductor, which preferably extends along an entire length of the structural element, enables potential distribution over the entire vehicle, in particular from the engine compartment to the rear.

According to an embodiment, it is proposed that at least one connection console is formed on the flat conductor and that the connection console is led out of the fiber composite. The connection bracket is in particular a connection lug, which is formed from an electrically conductive material, for example a copper material or an aluminium material or also bimetallic. In particular, a bimetallic connection console, but also any other connection console, can be connected to the flat conductor in a material bond, for example by means of welding, in particular by means of friction welding, ultrasonic welding or resistance welding. The connection console may have an outgoing direction transverse to the longitudinal direction of the flat conductor, in particular perpendicular to the longitudinal direction of the flat conductor. The connection console may be a flat part. In the case of a metallic connection console, a first end of the connection console may be formed from the material of the flat conductor, and a second end of the connection console, which is led out of the composite material, may be formed from a different material therefrom. A first material of the terminal console may be an aluminium material, and a second material of the terminal console may be a copper material. A first material of the connection console may be a copper material, and a second material of the connection console may be an aluminium material. In particular, when a copper material is led out of the composite material, a stranded copper conductor, in particular a flexible stranded copper conductor, can be directly connected thereto, for example. This may be particularly useful for connecting the flat conductor to a battery terminal. Thus, a battery pole terminal can be connected to the connection console via a flexible copper cable. The flexible copper cable or the conductor of the cable can be soldered, welded, crimped or screwed to the connection console.

According to an embodiment, it is proposed that a number of connection consoles are arranged on the flat conductor. The connection consoles may be arranged spaced apart from each other along the flat conductor with a regular or an irregular spacing. The connection consoles may branch off from the flat conductor in the same direction and/or in different directions. In particular, the number of actual connections to the flat conductor may be less than the number of connection consoles. Thus, in the assembled state, some of the connection consoles are free of an electrical connection. This has the advantage that a single configuration of the flat conductor with a number of connection consoles can be used for a variety of electrical configurations of vehicles. Thus, a wide variety of auxiliary consumers can be connected to the flat conductor at a wide variety of connection consoles along the structural element, depending on the configuration of the vehicle. This significantly increases the flexibility of the flat conductor and reduces the cost of a flat conductor due to the high quantity of a single configuration compared to individual configurations.

According to one embodiment, it is proposed that at least two mutually insulated flat conductors are routed inside the fiber composite. In particular, the flat conductors may be routed side by side or on top of each other with 2 to 10 fiber layers between the flat conductors. It may also be sufficient that only the composite material insulates the flat conductors against each other, so that no fiber layer is located between the flat conductors. With the aid of the multiple insulated flat conductors, either a multi-voltage electrical system with different voltage levels and/or a battery positive terminal as well as a battery negative terminal can be routed as a ground line in the structural element. At the respective flat conductors, the connection consoles may be arranged as described above.

According to an embodiment, it is proposed that a first flat conductor is electrically connected to a first flexible cable via a connection console and that a second flat conductor is electrically connected to a second flexible cable via a connection console. The connection to the flexible cable may be established as described above. The flexible cables can be used to connect a first flat conductor to a first battery terminal, for example, and a second flat conductor to a second battery terminal. For this purpose, a battery pole clamp may be arranged on the flexible cables.

According to an embodiment, it is proposed that at least one flexible cable is connected to a pole of a battery, in particular that one flexible cable is connected to the battery via a battery pole clamp.

According to an embodiment, it is proposed that at least two flat conductors overlap one another in sections and are electrically connected to one another in the region of the overlap, in particular by form-fit and/or material-locking connections. Due to the overlapping and connection at the overlapping areas, a grid-like interconnection of the flat conductors within the structural element can be established, which increases the redundancy and overall current carrying capacity.

According to one embodiment, it is proposed that the structural element is at least part of a front axle module and/or a passenger compartment. In this case, for example, the flat conductor may extend over the entire length of a vehicle via the front axle module and the passenger compartment. It is also possible that a first structural element is a front axle module and a second structural element is a passenger compartment, and at least one previously described flat conductor is guided in each of these structural elements in the manner described above. At the interface between the two structural elements, an electrical connection can be established between the flat conductors via at least one connection bracket. Thus, the flat conductors can be interconnected from structural element to structural element so that an interconnected conductor network extends along the entire vehicle via the various structural elements.

This in particular is the case when the flat conductor is led out of the structural element and projects into a rear vehicle area. A rear vehicle area can be formed as a structural element or also as a support frame. Thus, for example, the electrical connection may be routed out of the passenger compartment and into the rear vehicle region.

Here, it is in particular proposed that before the layers are connected, flat conductors and fiber layers are formed, in particular drawn, pressed or deep-drawn, and only then is the composite material applied, to thereby bring the layers together to form a laminate.

BRIEF DESCRIPTION OF THE DRAWINGS

In the following, the subject matter is explained in more detail with reference to a drawing showing embodiments. In the drawing show.

DETAILED DESCRIPTION OF SPECIFIC EMBODIMENTS

Figure 1A:
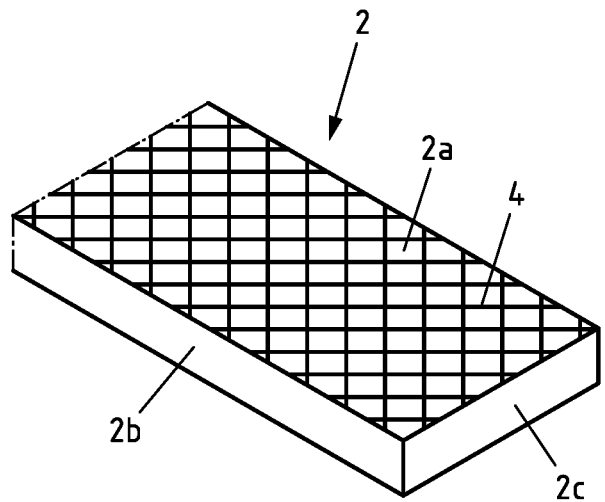
FIG. 1a-d different surface structures of flat conductors according to embodiments.

FIG. 1a shows a flat conductor 2, which may be formed from one of the abovementioned materials. The flat conductor 2 has a rectangular cross-section and two wide surfaces 2a and two narrow surfaces 2b as well as two end faces 2c.

On at least one of the surfaces 2a, b, a relief structure 4 such as is on the surface 2a in FIG. 1a can be embossed. The surface structure provided in FIG. 1a is a grid structure and regular.

Figure 1B:
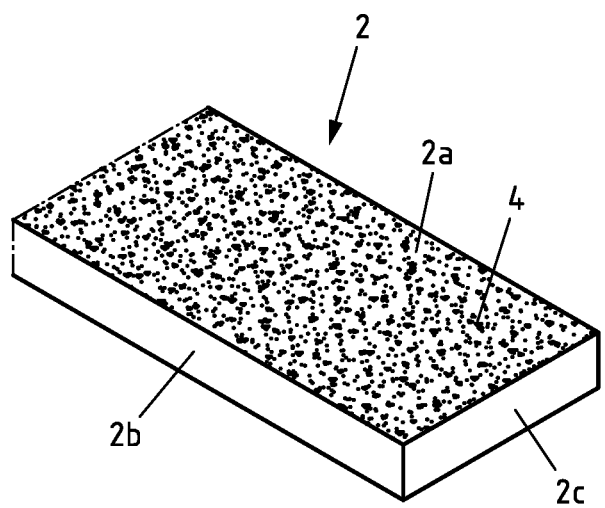

FIG. 1b shows another example embodiment in which the surface structure 4 on the surface 2a is irregular, for example by introducing an increased roughness.

Figure 1C:
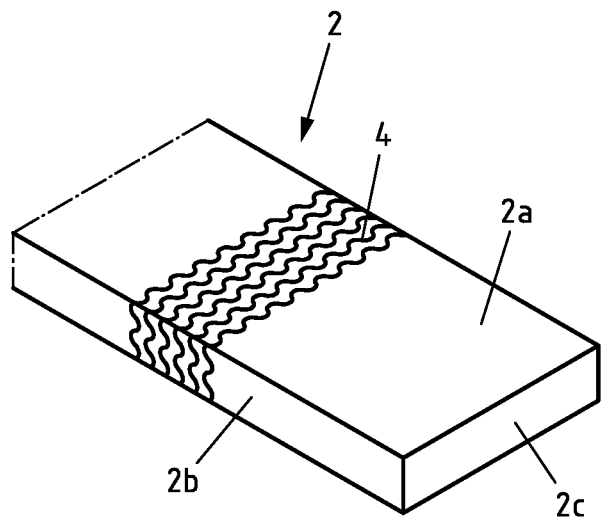

FIG. 1c shows another example of a flat conductor 2 in which an undulating, regular relief structure is applied to the surface 4 on each of the surfaces 2a and 2b.

Figure 1D:
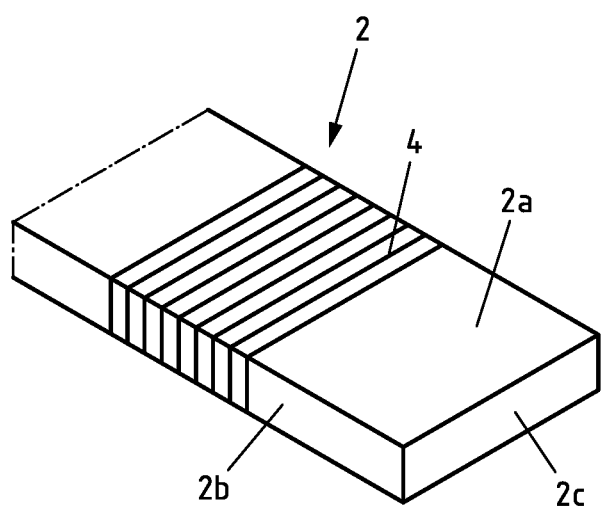

FIG. 1d shows a further example of an embodiment of a flat conductor 2 in which a strip-shaped relief structure 4 is applied.

The relief structure 4 can either be applied uninterruptedly along a longitudinal axis on one, two, three or four surfaces 2a, 2b, or areas with a relief structure can be spaced apart by areas without a relief structure.

Figure 2A:
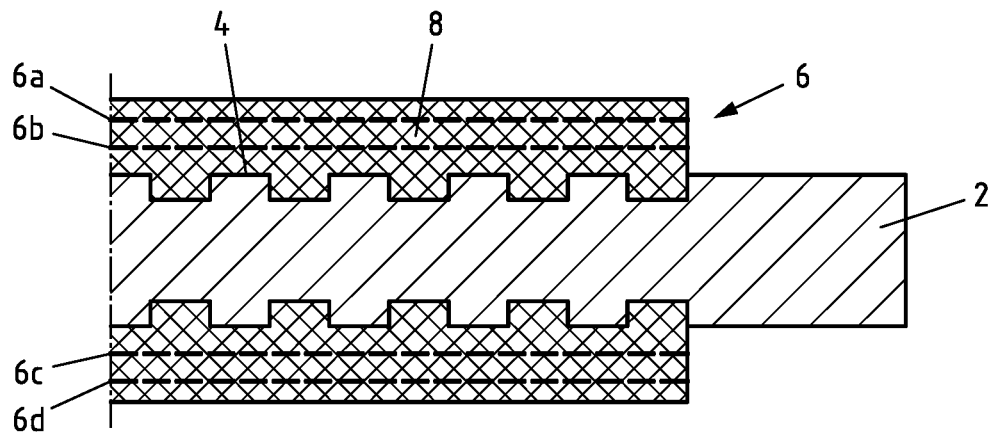
FIG. 2a a cross-section through a structural element with a fiber composite and a flat conductor with a second relief structure.

FIG. 2a shows a cross-section (strongly simplified) through a flat conductor 2 according to FIG. 1d in a fiber composite. The flat conductor 2 is incorporated in a fiber composite 6. The fiber composite 6 is formed of fiber layers 6a-d, which are stacked on top of each other. Between two fiber layers 6b, c, the flat conductor is included in the composite structure. A matrix of a composite material 8 is introduced between the fiber layers 6a-d of the composite structure 6. It can be seen that the composite material 8 is not only introduced between the fiber layers 6a-d, but penetrates into the relief structure of the surface of the flat conductor 2. After curing of the composite material 8, the laminate of the fiber layers 6a-d and the flat conductor 2 is bonded by the composite material 8. The protrusions and recesses in the surface of the relief structure 4 result in a considerably improved form fit between the fiber composite 6 and the flat conductor 2, so that delamination is counteracted.

Figure 2B:
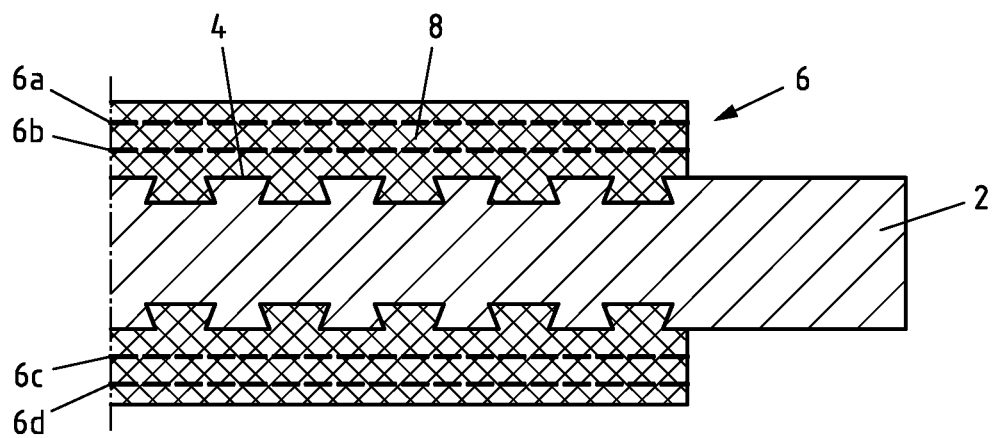
FIG. 2b a cross-section through a structural element with a fiber composite and a flat conductor with a third relief structure.

FIG. 2b shows a flat conductor 2 with a relief structure that has undercuts. It can be seen that the undercuts undercut the surface of the flat conductor that is adjacent to the fiber composite 6. The composite material can, as long as it is liquid, penetrate into these undercuts. When the composite material 8 has cured, it is interlocked with the undercuts so that the fiber composite 6 is held positively against the flat conductor 2.

Figure 2C:
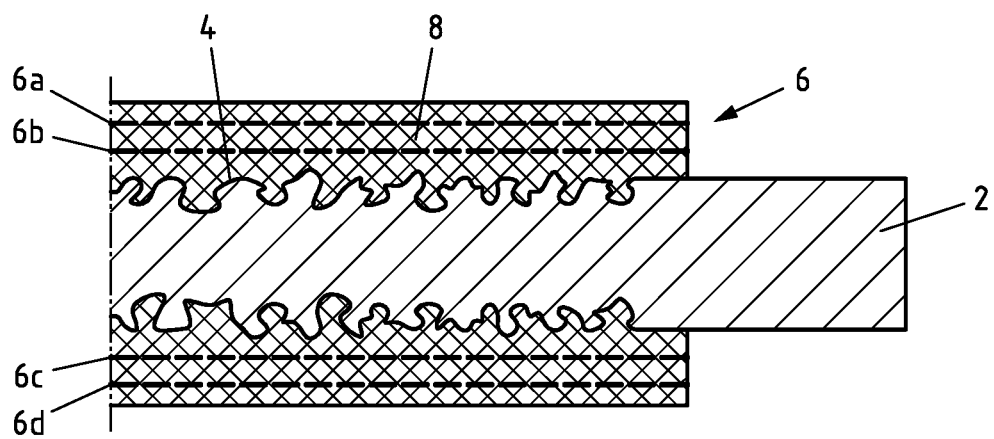
FIG. 2c a cross-section through a structural element with a fiber composite and a flat conductor with a first relief structure.

FIG. 2c shows another possible relief structure. Here, the surface of the flat conductor is porous with a penetration depth of up to, for example, 10 mm, preferably also 20 mm, in particular less than 20% of the total thickness of the flat conductor 2. The porosity is an open porosity with a pore size of more than 50 nm. The porosity is between 10% and 40%, preferably less than 50%, in particular less than 40% or less than 30%. Preferably, the porosity is more than 5% or 10%. The pores form the undercuts of the relief structure into which the composite material 8 can penetrate.

Figure 3A:
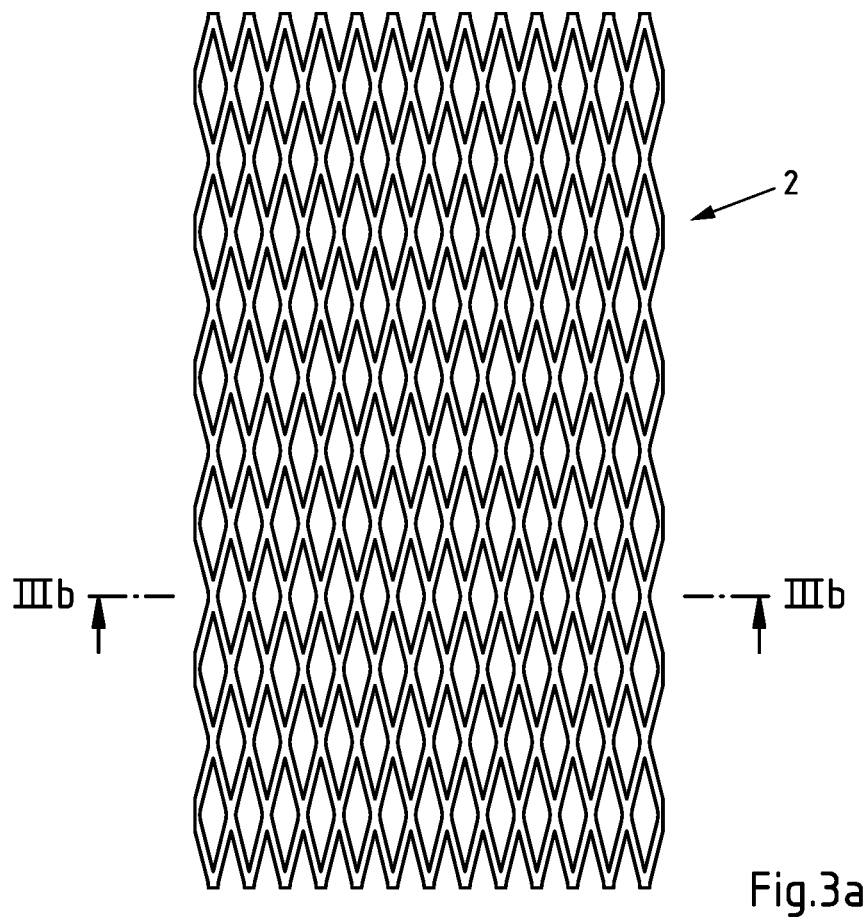
FIG. 3a-b a flat conductor with a lattice-like surface structure.
Figure 3B:
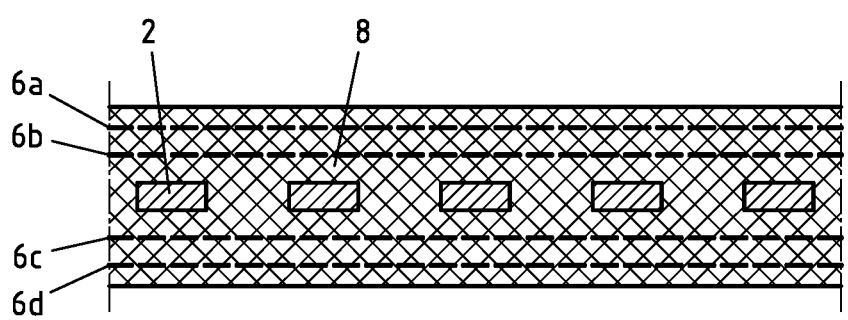

FIG. 3a shows another flat conductor 2 which is lattice-shaped and has openings. Along section IIIb, which is shown in 3b, it can be seen that the composite material 8 penetrates into the lattice structure and is arranged between the webs of the flat conductor 2. After curing of the composite material 8, there is also a very good connection by form fit between the fiber layers 6a-d and the flat conductor 2.

Figure 4A:
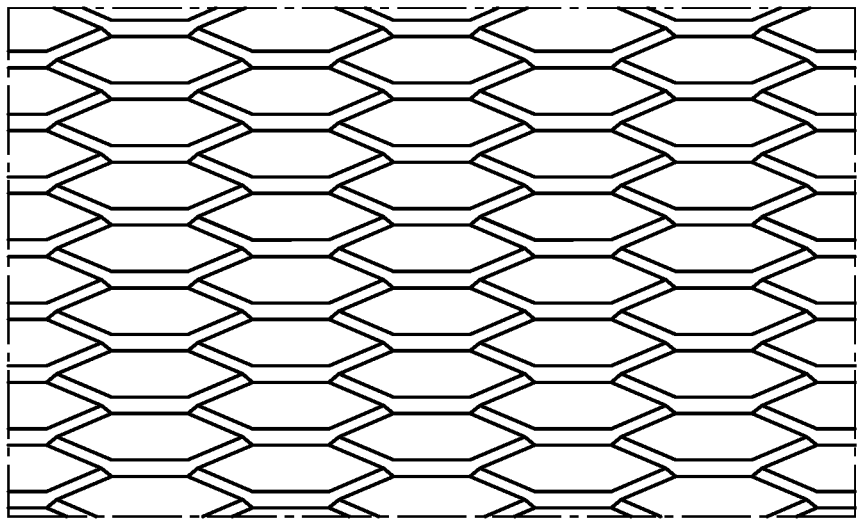
FIG. 4a-d a flat conductor with different lattice-like structures.
Figure 4B:
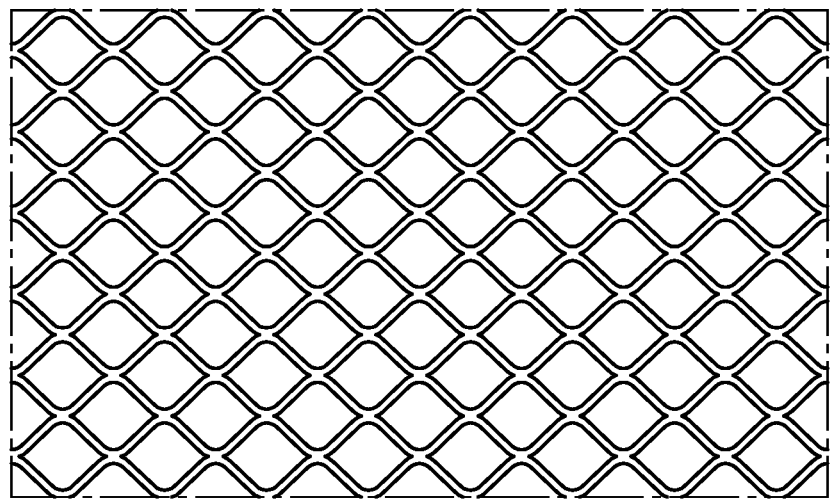
Figure 4C:
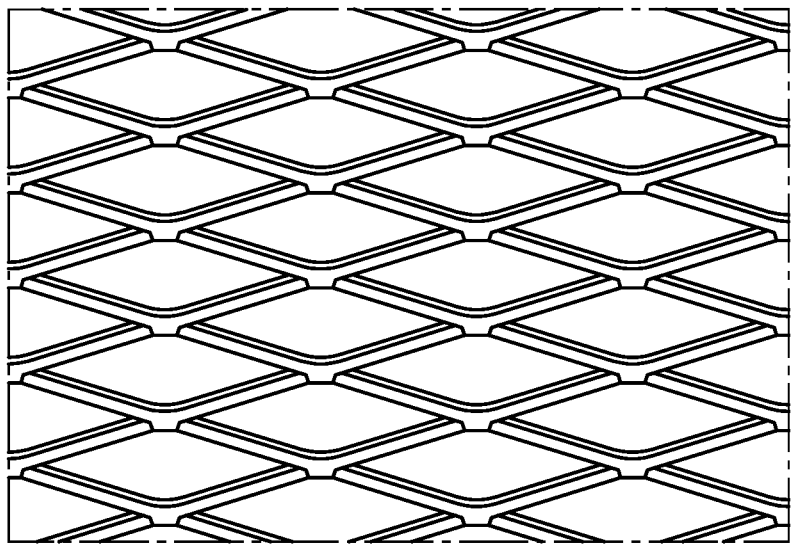
Figure 4D:
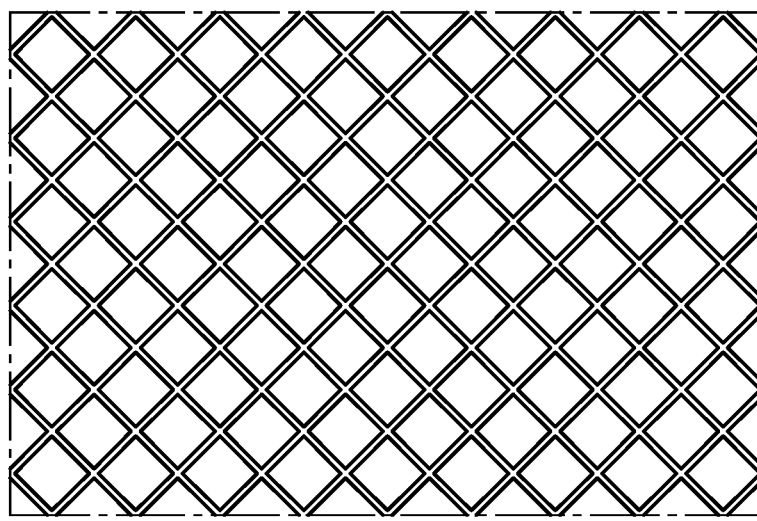

FIGS. 4a-d show various types of lattice structures, FIG. 4a showing a hexagonal lattice structure, FIG. 4b showing a first diamond-shaped lattice structure, FIG. 4c showing a coarse diamond-shaped lattice structure and FIG. 4d showing a square lattice structure, each with openings and webs of the flat conductor 2. These and other lattice structures are suitable for forming the structural element according to the subject matter. The lattice structures can be formed from expanded metal or wires.

Figure 5:
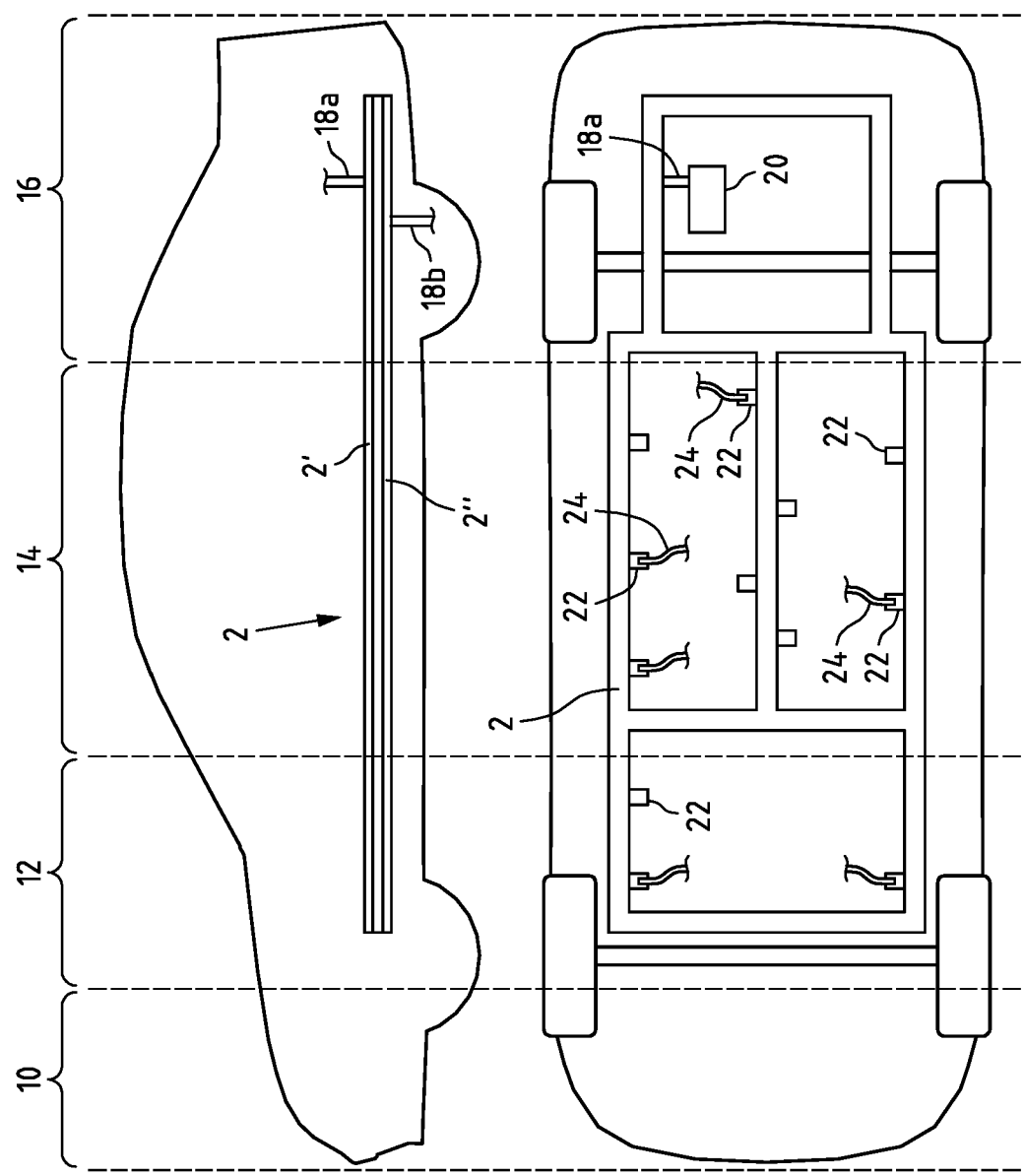
FIG. 5 structural elements with flat conductors and fiber composites.

FIG. 5 schematically shows the structure of a motor vehicle with different structural elements. The motor vehicle has a crash structure 10, a front axle module 12, a passenger compartment 14 and a rear body 16. In particular, the structural elements in the areas 12, 14, 16 may be formed of a fiber composite material. In one or more structural elements in the areas 12-16, a flat conductor 2 may be introduced either as a single layer or in multiple layers with two flat conductor layers 2', 2". The two flat conductor layers 2', 2" can be electrically insulated from one another by at least the composite material, but in particular also by at least one fiber layer. Electrical connections 18a, 18b can be provided on the flat conductor layers 2', 2", for example in the region of the rear body 16. These electrical connections may be formed by flexible leads connected to a motor vehicle battery 20, for example, each with one pole of each of the batteries 20.

In each of the areas 12, 14, a structural element with a flat conductor 2 in it may be hermetic, and at the transitions between the areas 12-16, the respective flat conductors 2 may be led out of the composite material and short-circuited to each other.

Connection consoles 22 may be provided at one or more of the flat conductor layers 2', 2". The connection consoles 22 can be equipped with electrical conductors 24 as required, in accordance with the respective requirement of an equipment variant. The number of connection consoles 22 can be greater than the actual number of connected electrical conductors 24 to accommodate different requirement variants.

Figure 6A:
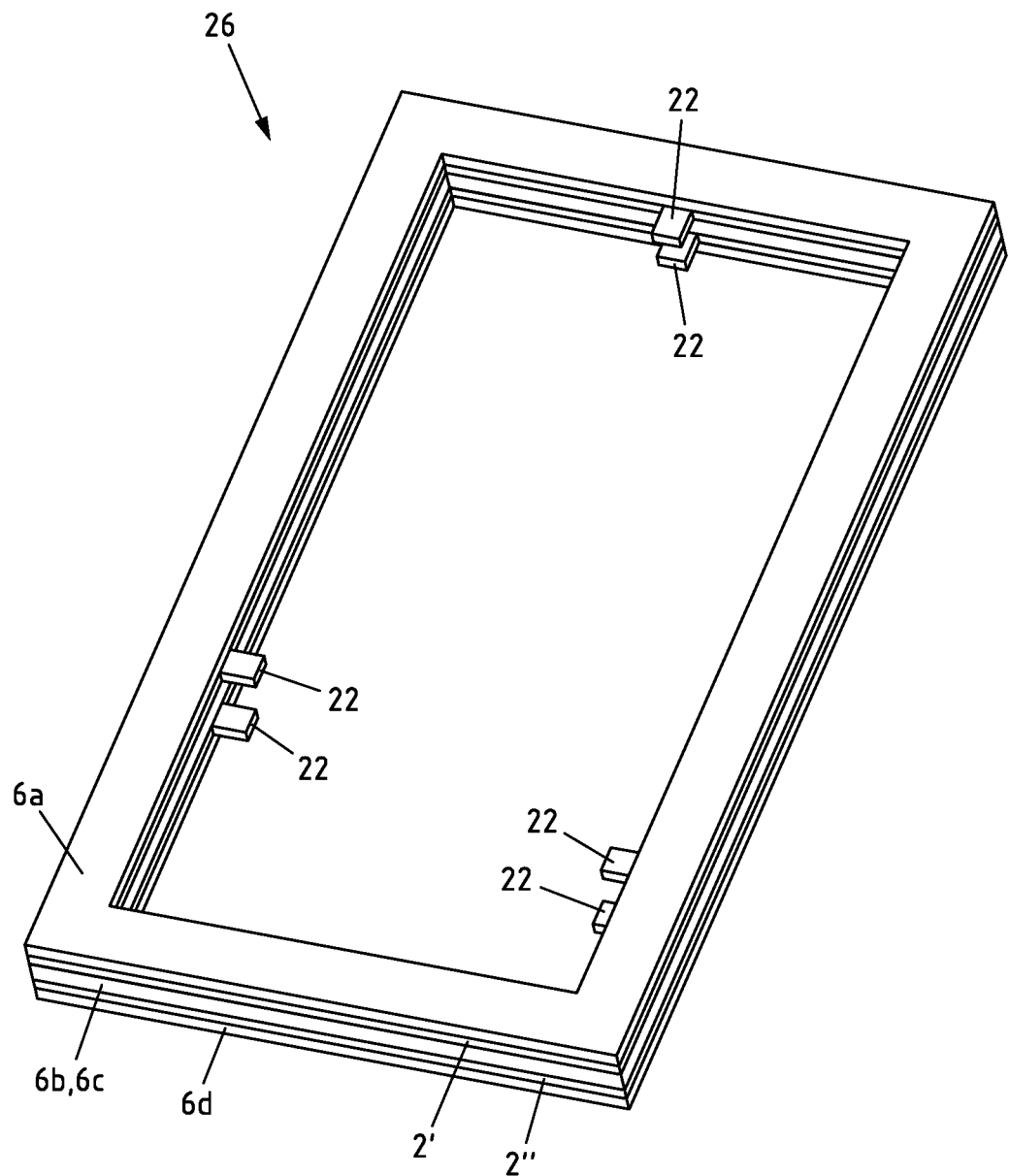
FIG. 6a-b a structural element with a fiber composite and flat conductors.

FIG. 6a shows a structural element, for example a frame 26 with 5 layers, wherein two flat conductor layers 2', 2" are arranged between respective fiber layers 6a-d. Each of the flat conductor layers 2', 2" may have at least one connection console 22.

Figure 6B:
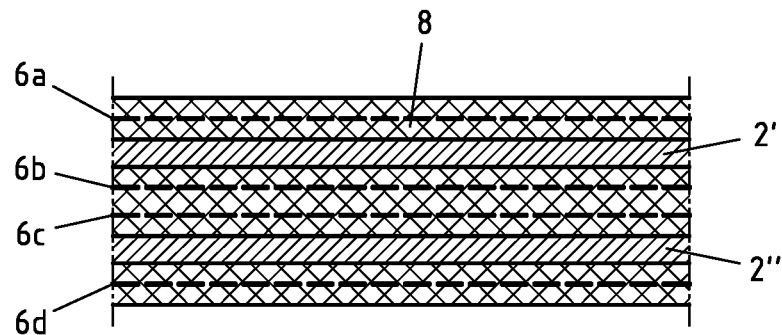

The arrangement of the flat conductor or the flat conductor layers 2', 2" in the fiber composite is shown again in FIG. 6b. The flat conductor layers 2', 2" can be integrated between the fiber layers 6a-d and a composite material 8.

Figure 7:
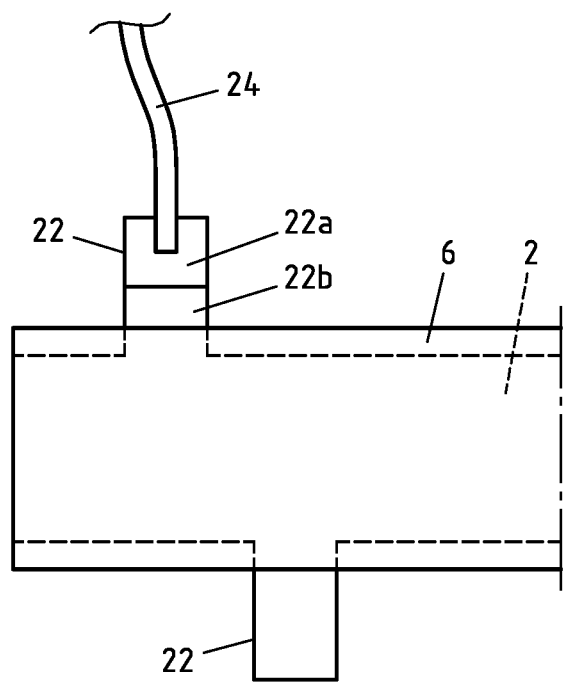
FIG. 7 various connection consoles on flat conductors.

FIG. 7 shows a flat conductor 2 in a composite layer 6 with two connection consoles 22, which branch off from the flat conductor 2 transversely to the longitudinal axis of the flat conductor 2. A connection console 22 may be formed bimetallically as a first material 22a and a second material 22b. In this context, for example, the material 22b, which is connected to the flat conductor 2 in a material bond, for example, may be formed from the same material as the flat conductor 2, and the area 22a may be formed from a metal material that is different therefrom. For example, the metal material of the area 22b can be an aluminium material and the area of the material 22a can be a copper material. Thus, an electrical cable 24 made of aluminium, for example, can be very easily connected to the copper material in the region 22a by means of soldering, crimping or the like.

LIST OF REFERENCE SIGNS 2 flat conductor
2', 2" layers
2a-c surfaces
4 relief structure
6 fiber composite
6a-d fiber layers
8 composite material
10 crash structure
12 front axle module
14 passenger compartment
16 rear body
18a, b battery cables
20 automotive battery 22 connection console
24 flexible cable
26 frame structure

What is claimed is:

1. Motor vehicle structural element comprising:
at least a first and a second fiber layer forming a rigid fiber composite, wherein the fiber layers are laminated to one another at least in sections, wherein the fiber composite is formed from fiber layers and a matrix of a composite material; and
at least one electrical flat conductor arranged between the fiber layers and laminated with the fiber layers,
wherein the flat conductor has a relief structure on at least one surface facing at least one fiber layer and the flat conductor is connected to the composite material via the relief structure in a form-fit,
wherein the flat conductor and a second flat conductor overlap one another in sections and are electrically connected to one another in the area of the overlap.

2. Motor vehicle structural element according to claim 1, wherein the relief structure forms undercuts in the surface facing the fiber layer.

3. Motor vehicle structural element according to claim 1, wherein the relief structure is formed from protrusions and/or recesses, or wherein the relief structure is formed from recesses which penetrate through the flat conductor.

4. Motor vehicle structural element according to claim 1, wherein the flat conductor is formed as a grid.

5. Motor vehicle structural element according to claim 1, wherein the flat conductor is formed from aluminium material.

6. Motor vehicle structural element according to claim 1, wherein the fiber layers are formed from glass fibers, carbon fibers, ceramic fibers, aramid fibers, boron fibers, basalt fibers, natural fibers, nylon fibers, and/or wherein the composite material is formed from a polymer, a duroplast, synthetic resin, elastomer, and/or thermoplastic.

7. Motor vehicle structural element according to claim 1, wherein the flat conductor is deep-drawn together with the fiber layers.

8. Motor vehicle structural element according to claim 1, wherein the flat conductor is formed as at least one electrically closed conductor loop in the structural element.

9. Motor vehicle structural element according to claim 1, wherein the flat conductor extends along an entire length of the structural element.

10. Motor vehicle structural element according to claim 1, wherein at least one connection console is formed on the flat conductor, and wherein the connection console is routed out of the fiber composite.

11. Motor vehicle structural element according to claim 1, wherein a number of connection consoles are arranged on the flat conductor which exceeds the number of actual electrical connections on the flat conductor, so wherein the assembled state at least one connection console is free of an electrical connection.

12. Motor vehicle structural element according to claim 1, wherein at least two mutually insulated flat conductors are routed in the fiber composite.

13. Motor vehicle structural element according to claim 1, wherein the flat conductor is electrically connected to a first flexible cable via a connection console, and wherein the second flat conductor is electrically connected to a second flexible cable via a connection console.

14. Motor vehicle structural element according to claim 1, wherein at least one flexible cable is connected to a pole of a battery via a battery pole clamp.

15. Motor vehicle structural element according to claim 1, wherein the flat conductor and the second flat conductor are electrically connected to one another in the area of the overlap in a form-fit.

16. Motor vehicle structural element according to claim 1, wherein the structural element is at least part of a front axle module and/or of a passenger compartment.

17. Motor vehicle structural element according to claim 1, wherein at least one flat conductor is routed out of the structural element and projects into a rear vehicle area.

18. Method of manufacturing a structural element, according to claim 1, with the steps of
providing a first fiber layer,
placing a flat conductor with a surface with a relief structure onto the first fiber layer,
providing a second fiber layer,
laminating the first fiber layer, the second fiber layer, and the flat conductor with a matrix of a composite material in such a way that the flat conductor is connected to the composite material via the relief structure in a form-fit.

19. Method according to claim 18,
wherein the first fiber layer, the flat conductor and the second fiber layer are deep-drawn, and subsequently the formed layers are laminated with the composite material so that the layers form a laminate.

20. Motor vehicle structural element according to claim 1, wherein the flat conductor and the second flat conductor are electrically connected to one another in the area of the overlap in a material-bond.

* * * * *